(12) United States Patent
Koskinen et al.

(10) Patent No.: US 12,284,691 B2
(45) Date of Patent: Apr. 22, 2025

(54) DEVICE, METHOD, APPARATUS AND COMPUTER READABLE MEDIUM FOR INTER-CU TOPOLOGY ADAPTATION

(71) Applicant: Nokia Technologies Oy, Espoo (FI)

(72) Inventors: Henri Markus Koskinen, Espoo (FI); Xiang Xu, Nanjing (CN); Samuli Turtinen, Ii (FI); Esa Malkamäki, Espoo (FI); Matti Laitila, Oulu (FI); Thomas Höhne, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 17/635,429

(22) PCT Filed: Aug. 16, 2019

(86) PCT No.: PCT/CN2019/101167
§ 371 (c)(1),
(2) Date: Feb. 15, 2022

(87) PCT Pub. No.: WO2021/030997
PCT Pub. Date: Feb. 25, 2021

(65) Prior Publication Data
US 2022/0312287 A1  Sep. 29, 2022

(51) Int. Cl.
*H04W 36/08* (2009.01)
*H04W 76/10* (2018.01)
(Continued)

(52) U.S. Cl.
CPC ......... *H04W 76/10* (2018.02); *H04W 36/087* (2023.05); *H04W 36/00695* (2023.05); *H04W 92/20* (2013.01)

(58) Field of Classification Search
CPC ..... H04W 36/08; H04W 76/10; H04W 92/20; H04W 36/087; H04W 36/00695; H04W 84/005; H04W 84/047
See application file for complete search history.

(56) References Cited

U.S. PATENT DOCUMENTS 10,136,359 B2  11/2018  Hampel et al.
2011/0170466 A1  7/2011  Kwun
(Continued)

FOREIGN PATENT DOCUMENTS

CN  102696265 A  9/2012
WO  2017/032409 A1  3/2017
(Continued)

OTHER PUBLICATIONS

"Revised WID: Integrated Access and Backhaul for NR", 3GPP TSG RAN meeting #84, RP-191558, Agenda: 9.4.11, Qualcomm, Jun. 3-6, 2019, 7 pages.
(Continued)

Primary Examiner — Un C Cho
Assistant Examiner — Lalita W Pace
(74) Attorney, Agent, or Firm — Nokia Technologies Oy

(57) ABSTRACT

Embodiments of the present disclosure relate to for inter-CU topology adaptation. A first device establishes a communication interface between the first device and a second device. The first device receives from the second device a handover complete message indicating that a handover of the second device from a third device to the first device is completed. The first device transmits to the second device a command indicating the second device to activate cells configured by the first device.

15 Claims, 7 Drawing Sheets

(51) Int. Cl.
H04W 92/20 (2009.01)
H04W 36/00 (2009.01)

(56) References Cited

U.S. PATENT DOCUMENTS

| | | | |
|---|---|---|---|
| 2014/0177557 | A1 | 6/2014 | Charbit et al. |
| 2016/0044744 | A1 | 2/2016 | Lee et al. |
| 2019/0253945 | A1 | 8/2019 | Paladugu et al. |
| 2019/0380128 | A1* | 12/2019 | Park .................. H04W 48/10 |
| 2020/0015132 | A1* | 1/2020 | Liu .................... H04W 36/385 |
| 2021/0227435 | A1* | 7/2021 | Hsieh ............... H04W 36/0064 |
| 2021/0274417 | A1* | 9/2021 | Zhou ................ H04W 74/002 |
| 2022/0201777 | A1* | 6/2022 | Teyeb ................ H04L 45/302 |

FOREIGN PATENT DOCUMENTS

| | | |
|---|---|---|
| WO | 2019/246446 A1 | 12/2019 |
| WO | 2021/032905 A1 | 2/2021 |

OTHER PUBLICATIONS

"CR to 38.300 on Integrated Access and Backhaul for NR", 3GPP TSG-RAN WG2 Meeting # 105bis, R2-1905476, Qualcomm, Apr. 8-12, 2019, 8 pages.

"3rd Generation Partnership Project; Technical Specification Group Radio Access Network; NG-RAN; Architecture description (Release 15)", 3GPP TS 38.401, V15.5.0, Mar. 2019, pp. 1-39.

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

"Discussion on network-controlled IAB migration handling", 3GPP TSG RAN WG3 Meeting #103, R3-190542, Agenda: 13.3.2.1, ZTE, Feb. 25-Mar. 1, 2019, 5 pages.

"IAB-node migration between different IAB-donors", 3GPP TSG-RAN WG3 #103, R3-190418, Agenda: 13.3.2.3, LG Electronics Inc, Feb. 25-Mar. 1, 2019, 5 pages.

"IAB baseline for 38.401", 3GPP TSG-RAN WG3 Meeting #103, R3-19xxxx, Qualcomm Incorporated, Feb. 25-Mar. 1, 2019, 16 pages.

"Overview on IAB node migration", 3GPP TSG-RAN WG3 Meeting #103bis, R3-191557, Agenda: 13.3.2.1, Samsung, Apr. 8-12, 2019, 4 pages.

"CR to 38.300 on Integrated Access and Backhaul for NR", 3GPP TSG-RAN WG2 Meeting #105bis, R2-1908169, Qualcomm, May 13-17, 2019, 9 pages.

"Support for IAB", 3GPP TSG RAN WG3 Meeting #104, R3-193288, Huawei, May 13-17, 2019, 9 pages.

"IEEE 802.11", Wikipedia, Retrieved on Feb. 24, 2022, Webpage available at : https://en.wikipedia.org/wiki/IEEE_802.11.

International Search Report and Written Opinion received for corresponding Patent Cooperation Treaty Application No. PCT/CN2019/101167, dated May 20, 2020, 9 pages.

"3rd Generation Partnership Project; Technical Specification Group Radio Access Network; Study on Integrated Access and Backhaul; (Release 15)", 3GPP TR 38.874, 1.0.0, Dec. 2018, 112 pages.

Extended European Search Report received for corresponding European Patent Application No. 19942304.7, dated Apr. 12, 2023, 9 pages.

"IAB inter-CU Topology Adaptation for Arch 1a", 3GPP TSG-RAN WG3 Meeting #102, R3-186456, Agenda: 24.2, Qualcomm Inc, Nov. 12-16, 2018, 9 pages.

Office action received for corresponding Chinese Patent Application No. 201980101424.8, dated Apr. 29, 2023, 7 pages of office action and no page of translation available.

Office Action received for corresponding Chinese Patent Application No. 201980101424.8, dated Sep. 14, 2023, (4 pages) of Office Action with English translation (4 pages).

Notice of Allowance received for corresponding European Patent Application No. 19942304.7, dated Feb. 8, 2024, 8 pages.

Extended European Search Report received for corresponding European Patent Application No. 24171613.3, dated Sep. 17, 2024, 9 pages.

* cited by examiner

DEVICE, METHOD, APPARATUS AND COMPUTER READABLE MEDIUM FOR INTER-CU TOPOLOGY ADAPTATION

RELATED APPLICATION

This application was originally filed as PCT Application No. PCT/CN2019/101167, filed on Aug. 16, 2019, of which is incorporated herein by reference in its entirety.

FIELD

Embodiments of the present disclosure generally relate to the field of telecommunication and in particular, to a device, method, apparatus and computer readable medium for inter-Centralized Unit (CU) topology adaptation.

BACKGROUND

Integrated Access and Backhaul (JAB) enables wireless relaying for New Radio (NR) access by using NR for backhauling. A relaying node is referred to as an IAB-node. The terminating node of NR backhauling on network side is referred to as an JAB-donor. The JAB-donor represents a gNB with additional functionality to support JAB. Backhauling may occur via a single or via multiple hops.

The IAB-node supports gNB-Distributed Unit (DU) functionality to terminate NR access interface to terminal devices and IAB-nodes, and to support F1 protocol to the gNB-CU on the JAB-donor. The IAB-node also supports the NR Uu radio interface, referred to as mobile termination (MT) functionality, to connect to the DU of another IAB-node or the JAB-donor, and to connect to the gNB-CU on the JAB-donor via Radio Resource Control (RRC).

In some scenarios, an IAB-node may change its attachment point from a source IAB-donor to a target IAB-donor different from the source IAB-donor. Such topology adaptation may be referred to as inter-CU topology adaptation. A procedure for inter-CU topology adaptation may involve the JAB node providing radio cells with configurations incompatible with the target CU. This may hinder mobility of terminal devices. Thus, how to minimize the duration of such situations needs to be discussed.

SUMMARY

In general, example embodiments of the present disclosure provide a solution for inter-CU topology adaptation.

In a first aspect, there is provided a first device. The first device comprises at least one processor; and at least one memory including computer program codes; the at least one memory and the computer program codes are configured to, with the at least one processor, cause the first device to: establish a communication interface between the first device and a second device; receive from the second device a handover complete message indicating that a handover of the second device from a third device to the first device is completed; and transmit to the second device a command indicating the second device to activate cells configured by the first device.

In a second aspect, there is provided a second device. The second device comprises at least one processor; and at least one memory including computer program codes; the at least one memory and the computer program codes are configured to, with the at least one processor, cause the second device to: establish a communication interface between a first device and the second device; perform a handover from the third device to the first device; receive from the first device a command indicating the second device to activate cells configured by the first device; and activate the cells based on the command.

In a third aspect, there is provided a second device. The second device comprises at least one processor; and at least one memory including computer program codes; the at least one memory and the computer program codes are configured to, with the at least one processor, cause the second device to: establish a communication interface between a first device and the second device; obtain information concerning cells configured by the first device; and in response to receiving from a third device a handover command indicating a handover of the second device from the third device to the first device, activate the cells.

In a fourth aspect, there is provided a method implemented at a device. The method comprises: establishing, at a first device, a communication interface between the first device and a second device; receiving from the second device a handover complete message indicating that a handover of the second device from a third device to the first device is completed; and transmitting to the second device a command indicating the second device to activate cells configured by the first device.

In a fifth aspect, there is provided a method implemented at a device. The method comprises: establishing, at a second device, a communication interface between a first device and the second device; performing a handover from the third device to the first device; receiving from the first device a command indicating the second device to activate cells configured by the first device; and activating the cells based on the command.

In a sixth aspect, there is provided a method implemented at a device. The method comprises: establishing, at a second device, a communication interface between a first device and the second device; obtaining information concerning cells configured by the first device; and in response to receiving from a third device a handover command indicating a handover of the second device from the third device to the first device, activating the cells.

In a seventh aspect, there is provided an apparatus comprising: means for establishing a communication interface between the first device and a second device; means for receiving from the second device a handover complete message indicating that a a handover of the second device from a third device to the first device is completed; and means for transmitting to the second device a command indicating the second device to activate cells configured by the first device.

In an eighth aspect, there is provided an apparatus comprising: means for establishing a communication interface between a first device and the second device; means for performing a handover from the third device to the first device; means for receiving from the first device a command indicating the second device to activate cells configured by the first device; and means for activating the cells based on the command.

In a ninth aspect, there is provided an apparatus comprising: means for establishing a communication interface between a first device and the second device; means for obtaining information concerning cells configured by the first device; and means for activating the cells in response to receiving from a third device a handover command indicating a handover of the second device from the third device to the first device.

In a tenth aspect, there is provided a computer readable medium comprising a computer program for causing an apparatus to perform at least the method according to the above fourth aspect.

In an eleventh aspect, there is provided a computer readable medium comprising a computer program for causing an apparatus to perform at least the method according to the above fifth aspect.

In a twelfth aspect, there is provided a computer readable medium comprising a computer program for causing an apparatus to perform at least the method according to the above sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
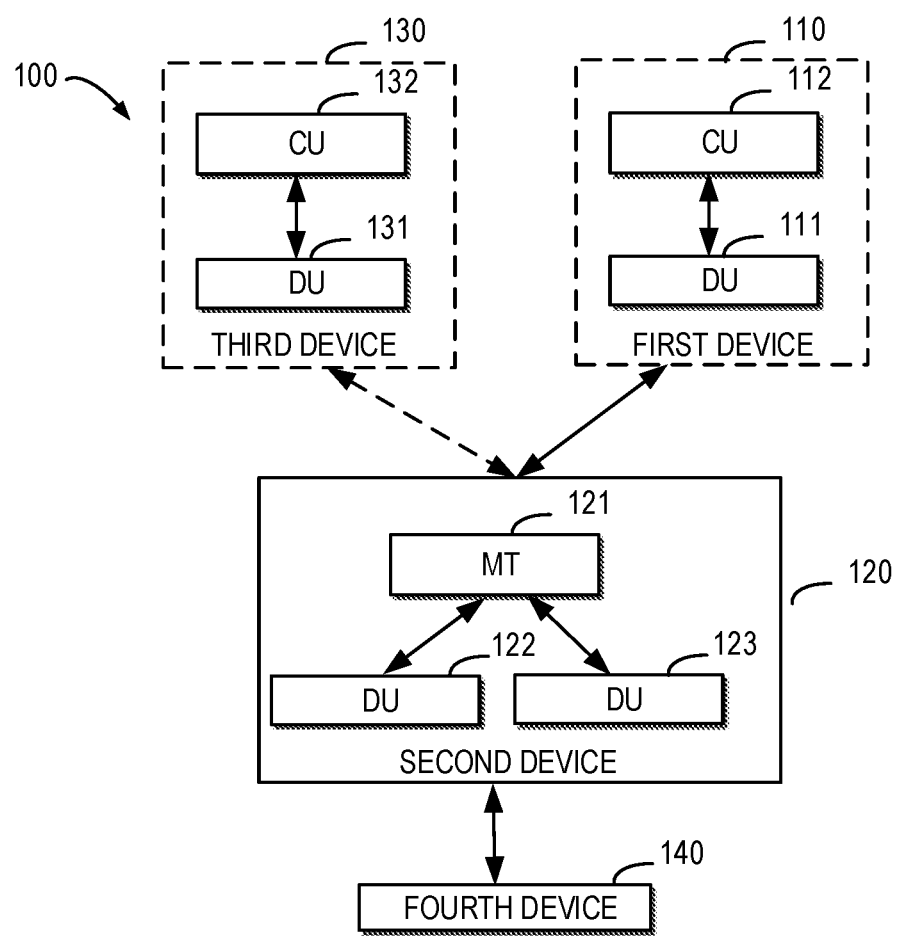
FIG. 1 shows an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As mentioned above, in some scenarios, an IAB-node may change its attachment point from a source CU of a source IAB-donor to a target CU of a target IAB-donor. The source CU is different from the target CU. Such topology adaptation may be referred to as inter-CU topology adaptation. The IAB-node changing its attachment point is referred to as a migrating IAB-node.

Conventionally, in a procedure for the inter-CU topology adaptation, firstly, the migrating IAB-node performs a handover from the source CU to the target CU. When the migrating IAB-node connects to the target CU during the handover, the migrating IAB-node has to discontinue service for terminal devices since it loses connectivity to the source CU. Consequently, terminal devices connected to the migrating IAB-node observe RLF. The RLF causes long service interruption for the terminal devices. The service interruption is on the order of seconds. After the handover has completed and a new route has been established, the migrating IAB-node establishes a new F1 Control plane interface (F1-C) connection to the target CU, receives configuration information and re-establishes service. This allows the terminal devices to perform RRC Connection Reestablishment with the target CU via the reconfigured IAB-node.

In order to at least in part solve above and other potential problems, example embodiments of the present disclosure provide a solution for inter-CU topology adaptation. In the solution, a migrating IAB-node establishes a communication interface with a target CU first and then performs a handover from a source CU to the target CU. In turn, cells configured by the target CU are activated. In this way, service interruption caused by RLF is reduced.

FIG. 1 shows an example communication network 100 in which embodiments of the present disclosure can be implemented. The communication network 100 includes a first device 110, a second device 120, a third device 130 and a fourth device 140. In this example, the second device 120 is illustrated as an IAB-node, the first device 110 and the third device 130 are illustrated as IAB-donors (such as gNBs) serving the IAB-node, and the fourth device 140 is illustrated as a terminal device or another IAB-node served by the second device 120. It is to be understood that the number of the first device, second device and the third device, and the fourth device is given for the purpose of illustration without suggesting any limitations to the present disclosure. The communication network 100 may include any suitable number of first, second, third and fourth devices adapted for implementing implementations of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In this example, the second device 120 comprises an MT 121, a first DU 122 and a second DU 123. Via the MT 121, the second device 120 connects to the third device 130 or the first device 110. Via the DUs 122 and 123, the second device 120 establishes RLC-channels to terminal devices and to MTs of downstream IAB-nodes (not shown). Each of the first DU 122 and the second DU 123 has F1-C connection only with one IAB-donor CU-CP. For example, the first DU 122 may have a first F1 interface with the CU 132 in the third device 130, and the second DU 123 may have a second F1 interface with the CU 112 in the first device 110.

The third device 130 comprises a DU 131 to support terminal devices and MTs of downstream one or more IAB-nodes. The third device 130 also comprises a CU 132 for the DUs of all IAB-nodes and for its own DU 131. Similarly, the first device 110 comprises a DU 111 to support terminal devices and MTs of downstream one or more IAB-nodes. The first device 110 also comprises a CU 112 for the DUs of all IAB-nodes and for its own DU 111. It is assumed that the DUs on an IAB-node are served by only one IAB-donor. This IAB-donor may change through topology adaptation.

It should be understood that although the DU 131 and the CU 132 is illustrated to be implemented on a single entity, the DU 131 and the CU 132 may be implemented on separated entities. Similarly, the DU 111 and the CU 112 may be implemented on a single entity or separated entities.

In some example embodiments, the DU 122 in the second device 120 connects to the CU 132 in the third device 130 or the CU 112 in the first device 110 using a F1 interface. F1 User plane interface (F1-U) runs over RLC channels on the wireless backhaul between the MT 121 in the second device 120 and the DU 131 in the third device 130 or the DU 111 in the first device 110. An adaptation layer is added, which holds routing information, enabling hop-by-hop forwarding. It replaces at least part of the IP functionality of the standard F1-stack. F1-U may carry a GTP-U header for the end-to-end association between CU and DU.

Initially, the second device 120 has an attachment point to the CU 132 in the third device 130. Thus, the CU 132 is also referred to as a source CU. Through inter-CU topology adaptation according to embodiments of the present disclosure, the second device 120 changes its attachment point from the source CU 132 in the third device 130 to the CU 112 in the first device 110. Thus, the CU 112 is also referred to as a target CU.

According to embodiments of the present disclosure, the second device 120 establishes a communication interface with the target CU first and then performs a handover from the source CU to the target CU. In turn, cells configured by the target CU are activated. In this way, service interruption caused by RLF is reduced.

Figure 2:
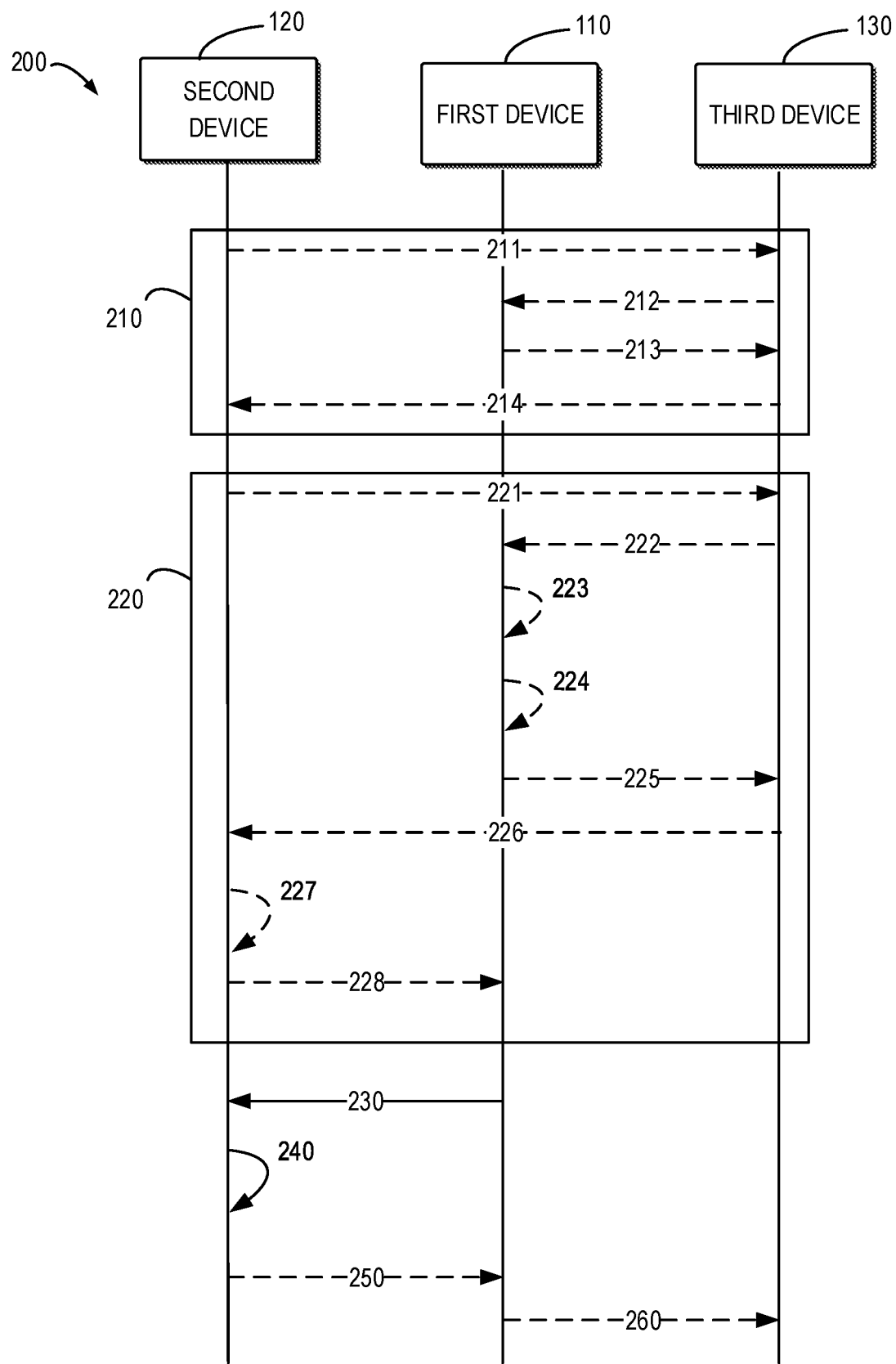
FIG. 2 shows a signaling chart illustrating a process for inter-CU topology adaptation according to some example embodiments of the present disclosure.

Principle and implementations of the present disclosure will be described in detail below with reference to FIGS. 2 to 7. FIG. 2 shows a signaling chart illustrating a process 200 for inter-CU topology adaptation according to some example embodiments of the present disclosure. For the purpose of discussion, the process 200 will be described with reference to FIG. 1. The process 200 may involve the first device 110, the second device 120 and the third device 130 as illustrated in FIG. 1. It would be appreciated that although the process 200 has been described in the communication system 100 of FIG. 1, this process may be likewise applied to other communication scenarios.

As shown in FIG. 2, the first device 110 establishes 210 a communication interface between the first device 110 and the second device 120. In some example embodiments, the communication interface is F1 interface. It should be appreciated that F1 interface is just an example, any appropriate communication interface may be used between the first device 110 and the second device 120.

In some example embodiments, in order to establish the communication interface, the second device 120 transmits 211 a request for establishing the communication interface to the third device 130. The third device 130 forwards 212 the request to the first device 110. In response to receiving the request from the third device 130, the first device 110 establishes the communication interface. Then, the first device 110 transmits 213 to the third device 130 a response indicating establishment of the communication interface. The third device 130 forwards 214 the response to the second device 120.

In the example embodiments where the communication interface is F1 interface, the request for establishing the communication interface may be an F1 SETUP REQUEST message, and the response may be F1 SETUP RESPONSE message.

With continued reference to FIG. 2, the first device 110 causes 220 a handover of the second device 120 from the third device 130 serving the second device 120 to the first device 110.

In some example embodiments, the handover may be initiated by the third device 130 based on measurements reported by the second device 120. In such example embodiments, the second device 120 transmits 221 a Measurement Report message to the third device 130. The measurements may be based on a Measurement Configuration the second device 120 received from the third device 130 before. The third device 130 transmits 222 an Xn Handover Request message to the first device 110 to initiate handover preparation. In case there is no Xn interface between the third device 130 and the first device 110, the handover request message is transmitted over an Access and Mobility Management Function (AMF) (not shown). The handover preparation may also be performed for all terminal devices served by the second device 120.

The CU 112 in the first device 110 transmits 223 an UE Context Setup Request message to the DU 111 in the first device 110 to create an MT context and setup one or more bearers. The DU 111 in the first device 110 transmits 224 an UE Context Setup Response message to the CU 112 in the first device 110. The first device 110 transmits 225 an Xn Handover Request Acknowledge message to the third device 130. The third device 130 transmits 226 a handover command to the second device 120. In some example embodiments, the handover command may be a Radio Resource Control (RRC) Reconfiguration message. In some example embodiments, the handover command may be a RRC Reconfiguration message indicating reconfiguration with synchronization. Upon receiving the handover command, the second device 120 synchronizes 227 to transmissions of the first device 110. In such example embodiments, service provided by the second device 120 to the terminal devices (such as the terminal device 140) continues, and the cells configured by the third device 130 are taken off the air only after the terminal devices have been handed over from them. Then, the second device 120 transmits 228 a handover complete message to the first device 110. The handover complete message indicates that the handover to the first device is completed. In some example embodiments, the handover complete message may be an RRC Reconfiguration Complete message.

In response to the handover being complete, the first device 110 transmits 230 to the second device 120 a command indicating the second device 120 to activate cells configured by the first device 110. In some example embodiments, the first device 110 transmits the command by transmitting a configuration update message comprising information concerning the cells to be activated. For example, the configuration update message may be a GNB CU CONFIGURATION UPDATE message. The information concerning the cells may comprise Physical Cell Identities (PCIs) of the cells or NR Cell Global Identities (CGIs) of the cells.

Upon receiving the command, the second device 120 activates 240 the cells configured by the first device 110. If these cells were activated while the second device 120 is still connected to the third device 130, the fourth device 140 served by these cells would consume resources of the first device 110, but also resources of the third device 130. This would make admission control very complex. According to embodiments of the present disclosure, after the handover of the second device 120 to the first device 110 is completed, the cells configured by the first device 110 are activated to serve the fourth device 140. Thus, admission control will not become complex.

In some example embodiments, optionally, the second device 120 transmits 250 to the first device 110 an indication indicating that a service status of the cells is In-Service. For example, the second device 120 may transmit to the first device 110 a GNB CU CONFIGURATION UPDATE ACKNOWLEDGE message comprising the indication.

Upon receiving the indication from the second device 120, the first device 110 transmits 260 to the third device 130 a message indicating a handover of at least one fourth device (such as the fourth device 140) served by the second device 120 to the activated cells.

For example, in order to switch the fourth device 140 served by the second device 120 from the old radio cells to the cells configured by the first device 110, the first device 110 may transmit to the second device 120 a UE Context Setup Request message. The second device 120 may transmit to the first device 110 a UE Context Setup Response message. Then, the first device 110 transmits a handover acknowledge message to the third device 130. The third device 130 transmits to the second device 120 a UE Context Modification message. The second device 120 may transmit a handover command to the fourth device 140 indicating the fourth device 140 to hand over to cells configured by the first device 110. Upon receiving the command, the fourth device 140 synchronizes to the cells configured by the first device 110. Then, the fourth device 140 transmits a handover complete message to the first device 110 via the second device 120.

According to example embodiments of the present disclosure, the second device 120 establishes the communication interface with the first device 110 first and then performs the handover from the third device 130 to the first device 110. In turn, the cells configured by the first device 110 are activated. In this way, service interruption caused by the handover is reduced.

Figure 3:
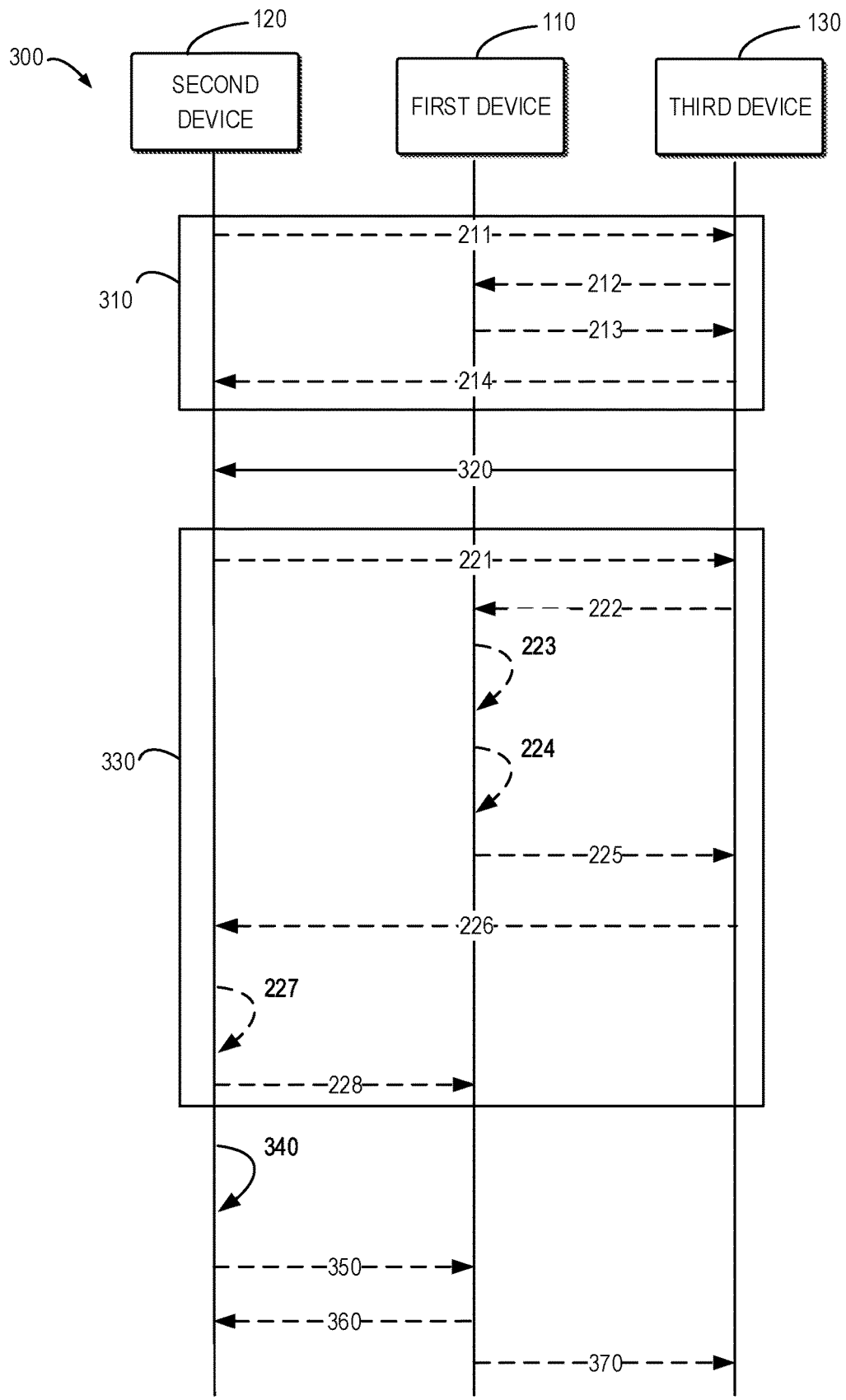
FIG. 3 shows a signaling chart illustrating a process for inter-CU topology adaptation according to some other example embodiments of the present disclosure.

FIG. 3 shows a signaling chart illustrating a process 300 for inter-CU topology adaptation according to some other example embodiments of the present disclosure. For the purpose of discussion, the process 300 will be described with reference to FIG. 1. The process 300 may involve the first device 110, the second device 120 and the third device 130 as illustrated in FIG. 1. It would be appreciated that although the process 300 has been described in the communication system 100 of FIG. 1, this process may be likewise applied to other communication scenarios.

As shown in FIG. 3, the first device 110 establishes 310 a communication interface between the first device 110 and the second device 120. In some example embodiments, the communication interface is F1 interface. It should be appreciated that F1 interface is just an example, any appropriate communication interface may be used between the first device 110 and the second device 120.

In some example embodiments, similar to the process 200, in order to establish the communication interface, acts 211, 212, 213 and 214 as shown in FIG. 2 may be performed in the process 300. For the purpose of conciseness, details of the acts 211, 212, 213 and 214 are omitted.

The second device 120 obtains 320 information concerning cells to be provided by the second device 120 from the first device 110. For example, the information concerning the cells may comprise PCIs of the cells or NR CGIs of the cells.

In some example embodiments, the second device 120 may obtain the information concerning the cells by receiving 214 from the third device 130 the response comprising the information concerning the cells. Alternatively, the second device 120 may obtain the information concerning the cells after receiving 214 from the third device 130 the response without the information concerning the cells.

The first device 110 causes 330 a handover of the second device 120 from the third device 130 serving the second device 120 to the first device 110.

In some example embodiments, similar to the process 200, in order to perform the handover to the first device 110, acts 221, 222, 223, 224, 225, 226, 227 and 228 as shown in FIG. 2 may be performed. For the purposed of conciseness, details of the acts 221 to 228 are omitted.

Upon handover to the first device 110, the second device 120 activates 340 the cells configured by the first device 110.

In some example embodiments, optionally, the second device 120 transmits 350 to the first device 110 an indication indicating that a service status of the cells is In-Service. For example, the second device 120 may transmit to the first device 110 a GNB DU CONFIGURATION UPDATE message comprising the indication. Upon receiving the indication from the second device 120, the first device 110 transmits 360 a GNB DU CONFIGURATION UPDATE ACKNOWLEDGE message to the second device 120.

Upon receiving the indication from the second device 120, the first device 110 transmits 370 to the third device 130 a message indicating a handover of at least one fourth device (such as the fourth device 140) served by the second device 120 to the activated cells. For example, in order to switch the fourth device 140 served by the second device 120 from the old radio cells to the cells configured by the first device 110, the acts described with reference to the process 200 may be performed.

The process 300 may save one Round-Trip Time (RTT) between the first device 110 and the second device 120 in the time it takes the first device 110 to know the new cells have been activated. There is no need for dedicated exchange of messages for activating the new cell initiated by the first device 110 and getting cell-activation confirmation from the second device 120. In multi-hop IAB case, the RTT between the first device 110 and the second device 120 may be significant.

Figure 4:
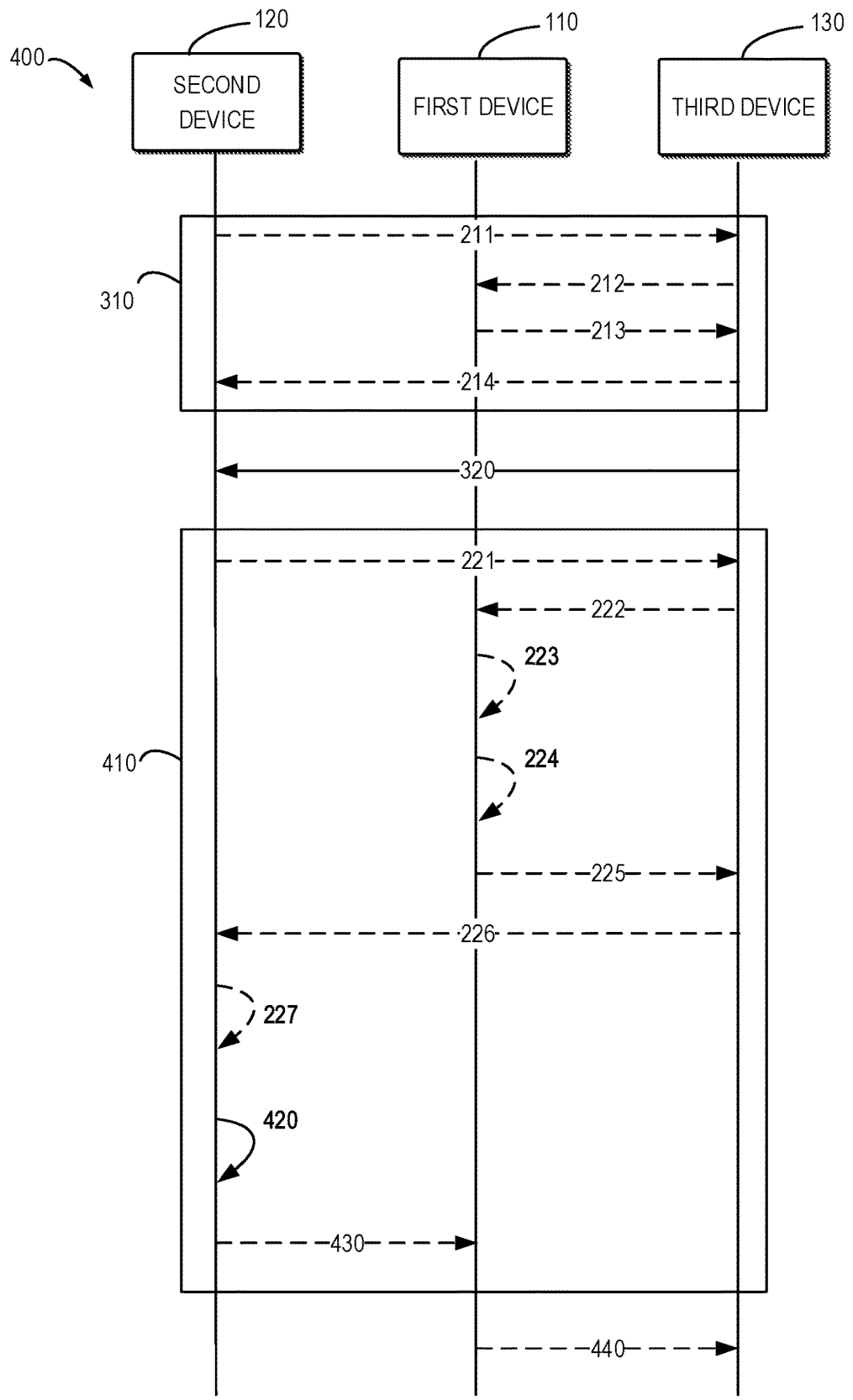
FIG. 4 shows a signaling chart illustrating a process for inter-CU topology adaptation according to still other example embodiments of the present disclosure.

FIG. 4 shows a signaling chart illustrating a process 400 for inter-CU topology adaptation according to some other example embodiments of the present disclosure. For the purpose of discussion, the process 400 will be described with reference to FIG. 1. The process 400 may involve the first device 110, the second device 120 and the third device 130 as illustrated in FIG. 1. It would be appreciated that although the process 400 has been described in the communication system 100 of FIG. 1, this process may be likewise applied to other communication scenarios.

As shown in FIG. 4, the first device 110 establishes 310 a communication interface between the first device 110 and the second device 120. In some example embodiments, the communication interface is F1 interface. It should be appreciated that F1 interface is just an example, any appropriate communication interface may be used between the first device 110 and the second device 120.

In some example embodiments, similar to the processes 200 and 300, in order to establish the communication interface, acts 211, 212, 213 and 214 as shown in FIG. 2 may be performed in the process 400. For the purposed of conciseness, details of the acts 211, 212, 213 and 214 are omitted.

The second device 120 obtains 320 information concerning cells to be provided by the second device 120 from the first device 110. For example, the information concerning the cells may comprise PCIs of the cells or NR CGIs of the cells.

In some example embodiments, the second device 120 may obtain the information concerning the cells by receiving 214 from the third device 130 the response comprising the information concerning the cells. Alternatively, the second device 120 may obtain the information concerning the cells after receiving 214 from the third device 130 the response without the information concerning the cells.

The first device 110 causes 410 a handover of the second device 120 from the third device 130 serving the second device 120 to the first device 110.

In some example embodiments, similar to the processes 200 and 300, in order to perform the handover to the first device 110, acts 221, 222, 223, 224, 225, 226 and 227 as shown in FIG. 2 may be performed. For the purposed of conciseness, details of the acts 221 to 227 are omitted.

The process 400 differs from the processes 200 and 300 in that after the act 227 is performed, an act 420 is performed instead of the act 228. In the act 420, the second device 120 activates the cells configured by the first device 110.

Upon activating the cells configured by the first device 110, the second device 120 transmits 430 a handover complete message to the first device 110. The handover complete message indicates that the handover to the first device is completed. In some example embodiments, the handover complete message may be an RRC Reconfiguration Complete message.

In some example embodiments, the handover complete message in the act 430 may comprise an indication indicating that a service status of the cells is In-Service. For example, the indication may be an activation identifier indicating the service status of the cells is In-Service.

In other example embodiments, the indication indicating that the service status of the cells is In-Service is the handover complete message itself transmitted in the act 430. In other words, transmission of the handover complete message indicates the service status of the cells is In-Service.

Compared with the process 200, in the process 400, there is no need for dedicated exchange of messages for activating the new cells initiated by the first device 110 and getting cell-activation confirmation from the second device 120. Compared with the process 300, in the process 400, there is no need for dedicated exchange of messages for notifying the first device 110 of cell-activation confirmation from the second device 120. Thus, the process 400 is signalling-efficient.

Upon receiving the indication from the second device 120, the first device 110 transmits 440 to the third device 130 a message indicating a handover of at least one fourth device (such as the fourth device 140) served by the second device 120 to the activated cells. For example, in order to switch the fourth device 140 served by the second device 120 from the old radio cells to the cells configured by the first device 110, the acts described with reference to the process 200 may be performed.

Figure 5:
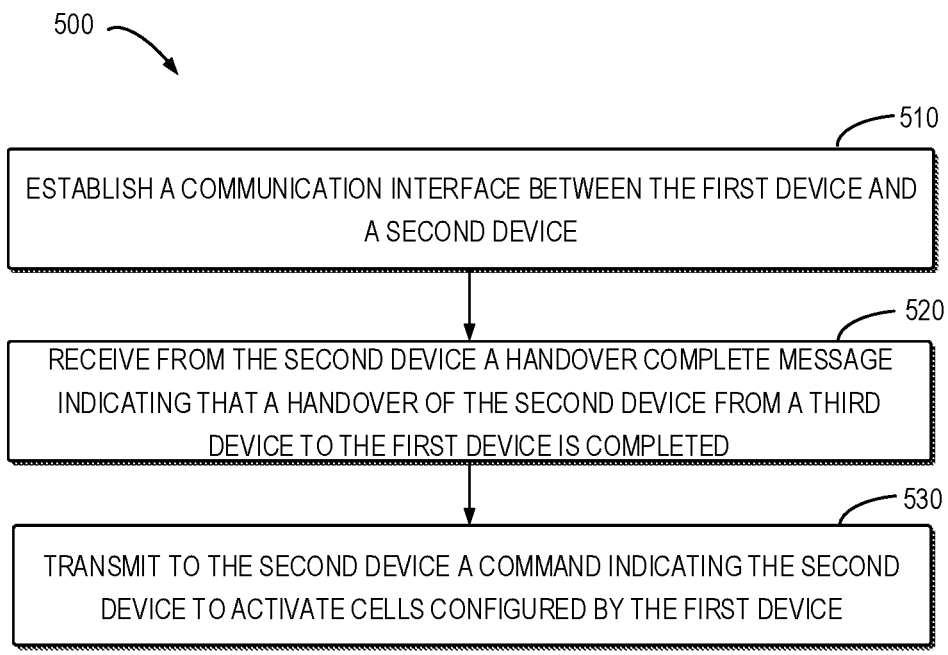
FIG. 5 shows a flowchart of a method implemented at a device in accordance with some example embodiments of the present disclosure.

FIG. 5 shows a flowchart of an example method 500 implemented at a device in accordance with some example embodiments of the present disclosure. For the purpose of discussion, the method 500 will be described from the perspective of the first device 110 with reference to FIG. 1. It would be appreciated that the method 500 may also be implemented at the second device 120, the third device 130 or the fourth device 140 in FIG. 1.

At block 510, the first device 110 establishes a communication interface between the first device and a second device.

At block 520, the first device 110 receives from the second device a handover complete message indicating that a handover of the second device from a third device to the first device is completed.

At block 530, the first device 110 transmits to the second device a command indicating the second device to activate cells configured by the first device.

In some example embodiments, establishing the communication interface comprises: receiving a request for establishing the communication interface from the second device; and transmitting a response indicating establishment of the communication interface to the second device.

In some example embodiments, transmitting the command comprises: transmitting a configuration update message comprising information concerning the cells.

In some example embodiments, the method 500 further comprises: receiving from the second device an indication indicating that a service status of the cells is In-Service.

In some example embodiments, receiving the indication comprises: receiving a configuration update acknowledge message comprising the indication.

Figure 6:
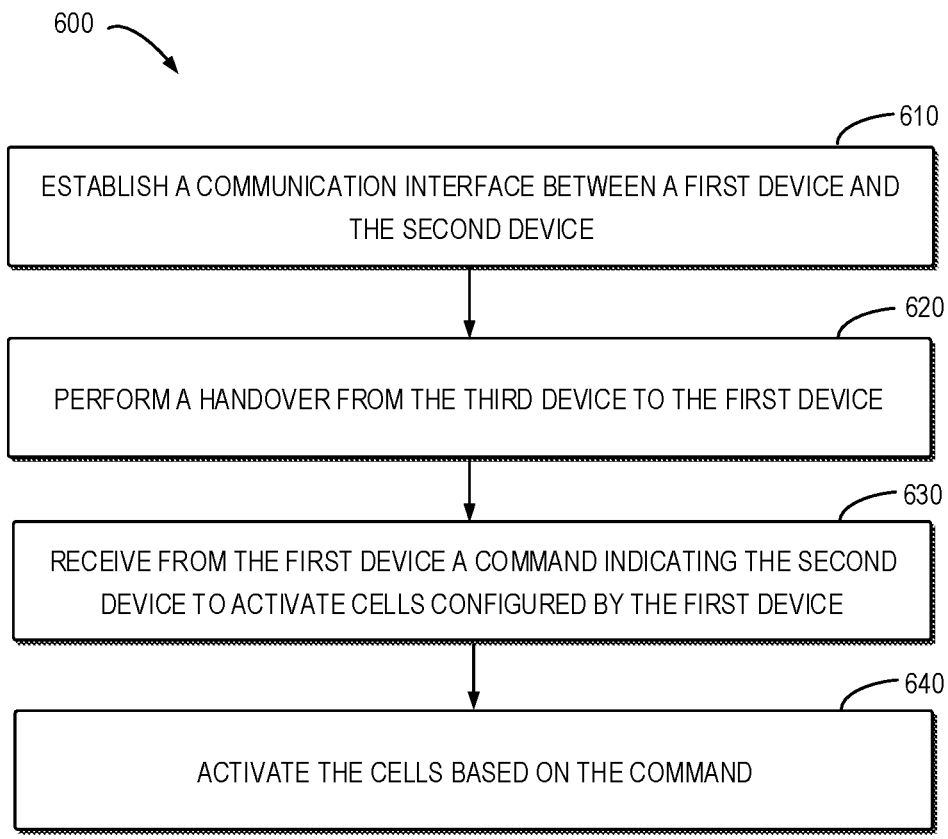
FIG. 6 shows a flowchart of a method implemented at a device in accordance with some example embodiments of the present disclosure.

FIG. 6 shows a flowchart of an example method 600 implemented at a device in accordance with some example embodiments of the present disclosure. For the purpose of discussion, the method 600 will be described from the perspective of the second device 120 with reference to FIG. 1. It would be appreciated that the method 600 may also be implemented at the first device 110, the third device 130 or the fourth device 140 in FIG. 1.

At block 610, the second device 120 establishes a communication interface between a first device and the second device.

At block 620, the second device 120 performs a handover from the third device to the first device.

At block 630, the second device 120 receives from the first device a command indicating the second device to activate cells configured by the first device.

At block 640, the second device 120 activates the cells based on the command.

In some example embodiments, establishing the communication interface comprises: transmitting a request for establishing the communication interface to the first device; and receiving from the first device a response indicating establishment of the communication interface.

In some example embodiments, receiving the command comprises: receiving a configuration update message comprising information concerning the cells.

In some example embodiments, the method 600 further comprises: transmitting to the first device an indication indicating that a service status of the cells is In-Service.

In some example embodiments, transmitting the indication comprises: transmitting a configuration update acknowledge message comprising the indication.

Figure 7:
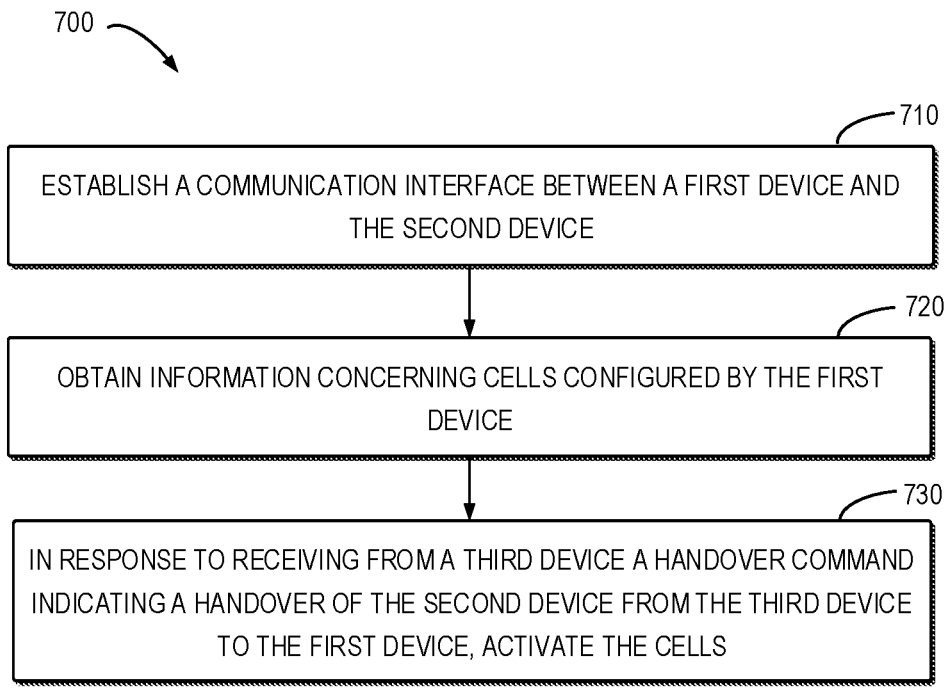
FIG. 7 shows a flowchart of a method implemented at a device in accordance with some example embodiments of the present disclosure.

FIG. 7 shows a flowchart of an example method 700 implemented at a device in accordance with some example embodiments of the present disclosure. For the purpose of discussion, the method 700 will be described from the perspective of the second device 120 with reference to FIG. 1. It would be appreciated that the method 700 may also be implemented at the first device 110, the third device 130 or the fourth device 140 in FIG. 1.

At block 710, the second device 120 establishes a communication interface between a first device and the second device.

At block 720, the second device 120 obtains information concerning cells configured by the first device.

At block 730, in response to receiving from a third device a handover command indicating a handover of the second device from the third device to the first device, the second device 120 activates the cells.

In some example embodiments, establishing the communication interface comprises: transmitting a request for establishing the communication interface to the first device; and receiving from the first device a response indicating establishment of the communication interface.

In some example embodiments, the method 700 further comprises: transmit to the first device an indication indicating that a service status of the cells is In-Service.

In some example embodiments, transmitting the indication comprises: transmitting a configuration update message comprising the indication.

In some example embodiments, transmitting the indication comprises: transmitting a first handover complete message comprising the indication.

In some example embodiments, the indication is an activation identifier indicating a service status of the cells is In-Service.

In some example embodiments, the indication is a second handover complete message.

Figure 8:
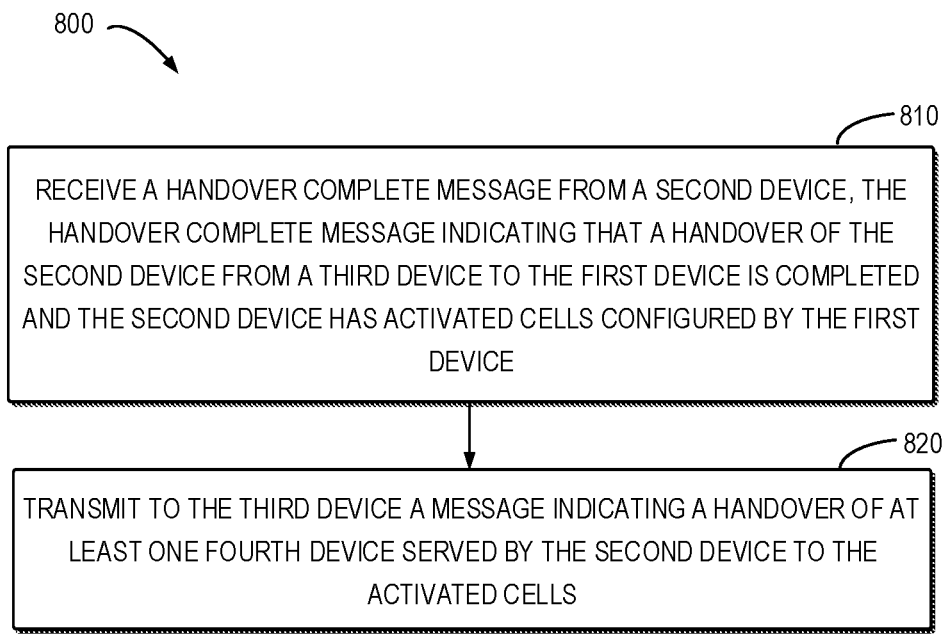
FIG. 8 shows a flowchart of a method implemented at a device in accordance with some example embodiments of the present disclosure.

FIG. 8 shows a flowchart of an example method 800 implemented at a device in accordance with some example embodiments of the present disclosure. For the purpose of discussion, the method 800 will be described from the perspective of the first device 110 with reference to FIG. 1. It would be appreciated that the method 800 may also be implemented at the second device 120, the third device 130 or the fourth device 140 in FIG. 1.

At block 810, the first device 110 receives a handover complete message from a second device. The handover complete message indicates that a handover of the second device from a third device to the first device is completed. The handover complete message also indicates that the second device has activated cells configured by the first device.

At block 820, the first device 110 transmits to the third device a message indicating a handover of at least one fourth device served by the second device to the activated cells.

It shall be appreciated that descriptions of features with reference to FIGS. 1 to 4 also apply to the methods 500, 600, 700 and 800, and have the same effects. Thus, the details of the features are omitted.

In some example embodiments, an apparatus capable of performing any of the method 500 (for example, the first device 110) may comprise means for performing the respective steps of the method 500. The means may be implemented in any suitable form. For example, the means may be implemented in a circuitry or software module.

In some example embodiments, the apparatus comprises means for establishing a communication interface between the first device and a second device; means for receiving from the second device a handover complete message indicating that a a handover of the second device from a third device to the first device is completed; and means for transmitting to the second device a command indicating the second device to activate cells configured by the first device.

In some example embodiments, means for establishing the communication interface comprises: means for receiving a request for establishing the communication interface from the second device; and means for transmitting to the third device a response indicating establishment of the communication interface to the second device.

In some example embodiments, means for transmitting the command comprises: means for transmitting a configuration update message comprising information concerning the cells.

In some example embodiments, the apparatus further comprises: means for receiving from the second device an indication indicating that a service status of the cells is In-Service.

In some example embodiments, means for receiving the indication comprises: means for receiving a configuration update acknowledge message comprising the indication.

In some example embodiments, an apparatus capable of performing any of the method 600 (for example, the second device 120) may comprise means for performing the respective steps of the method 600. The means may be implemented in any suitable form. For example, the means may be implemented in a circuitry or software module.

In some example embodiments, the apparatus comprises means for establishing a communication interface between a first device and the second device; means for performing a handover from the third device to the first device; means for receiving from the first device a command indicating the second device to activate cells configured by the first device; and means for activating the cells based on the command.

In some example embodiments, means for establishing the communication interface comprises: means for transmitting a request for establishing the communication interface to the first device; and means for receiving from the first device a response indicating establishment of the communication interface.

In some example embodiments, means for receiving the command comprises: means for receiving a configuration update message comprising information concerning the cells.

In some example embodiments, the apparatus further comprises: means for transmitting to the first device an indication indicating that a service status of the cells is In-Service.

In some example embodiments, means for transmitting the indication comprises: means for transmitting a configuration update acknowledge message comprising the indication.

In some example embodiments, an apparatus capable of performing any of the method 700 (for example, the second device 120) may comprise means for performing the respective steps of the method 700. The means may be implemented in any suitable form. For example, the means may be implemented in a circuitry or software module.

In some example embodiments, the apparatus comprises: means for establishing a communication interface between a first device and the second device; means for obtaining information concerning cells configured by the first device; and means for activating the cells in response to receiving from a third device a handover command indicating a handover of the second device from the third device to the first device.

In some example embodiments, means for establishing the communication interface comprises: means for transmitting a request for establishing the communication interface to the first device; and means for receiving from the first device a response indicating establishment of the communication interface.

In some example embodiments, the apparatus further comprises: means for transmitting to the first device an indication indicating that a service status of the cells is In-Service.

In some example embodiments, means for transmitting the indication comprises: means for transmitting a configuration update message comprising the indication.

In some example embodiments, means for transmitting the indication comprises: means for transmitting a first handover complete message comprising the indication.

In some example embodiments, the indication is an activation identifier indicating a service status of the cells is In-Service.

In some example embodiments, the indication is a second handover complete message.

In some example embodiments, an apparatus capable of performing any of the method 800 (for example, the first device 110) may comprise means for performing the respective steps of the method 800. The means may be implemented in any suitable form. For example, the means may be implemented in a circuitry or software module.

In some example embodiments, the apparatus comprises means for receiving a handover complete message from a second device, the handover complete message indicating that a handover of the second device from a third device to the first device is completed and the second device has activated cells configured by the first device; and means for transmitting to the third device a message indicating a handover of at least one fourth device served by the second device to the activated cells.

Figure 9:
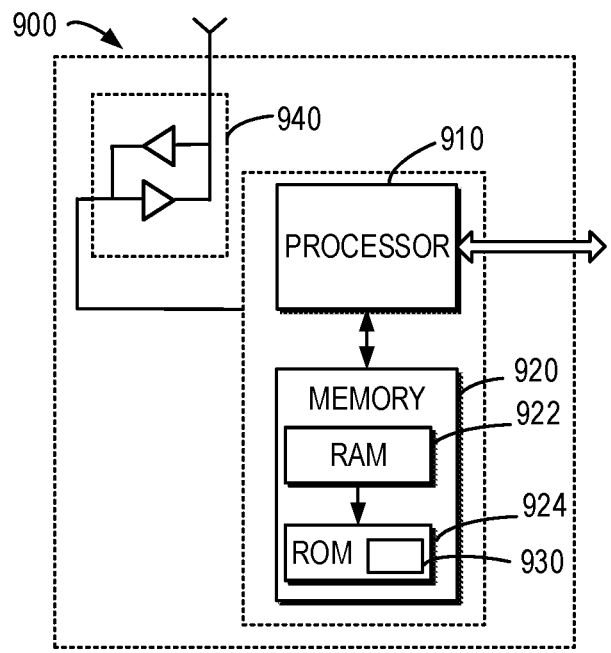
FIG. 9 illustrates a simplified block diagram of an apparatus that is suitable for implementing some other embodiments of the present disclosure.

FIG. 9 is a simplified block diagram of a device 900 that is suitable for implementing embodiments of the present disclosure. The device 900 may be provided to implement the communication device, for example the first device 110, the second device 120, the third device 130, or the fourth device 140 as shown in FIG. 1. As shown, the device 900 includes one or more processors 910, one or more memories 920 coupled to the processor 910, and one or more communication modules 940 coupled to the processor 910.

The communication module 940 is for bidirectional communications. The communication module 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 924. The processor 910 may perform any suitable actions and processing by loading the program 930 into the RAM 922.

The embodiments of the present disclosure may be implemented by means of the program 930 so that the device 900 may perform any process of the disclosure as discussed with reference to FIGS. 2 to 8. The embodiments of the present disclosure may also be implemented by hardware or by a combination of software and hardware.

Figure 10:
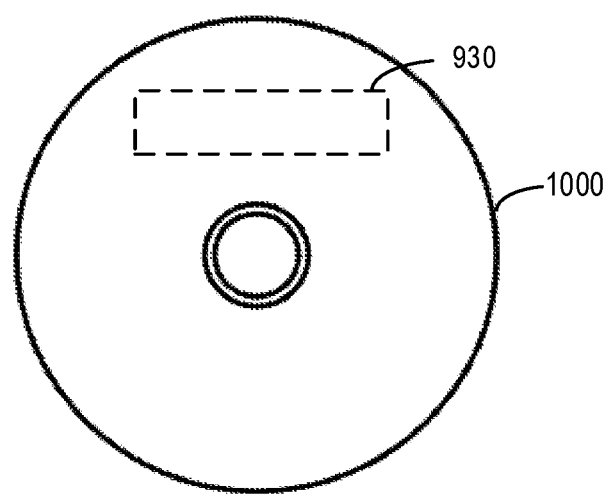
FIG. 10 illustrates a block diagram of an example computer readable medium in accordance with some example embodiments of the present disclosure.

In some example embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like. FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500, 600, 700 and 800 as described above with reference to FIGS. 5, 6, 7 and 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program code;
      the at least one memory and the computer program code configured to, with the at least one processor, cause the first device to:
   establish a communication interface between the first device and a second device;
   receive from the second device a handover complete message indicating that a handover of the second device from a third device to the first device is completed; and
   transmit to the second device a command indicating the second device to activate cells configured by the first device to serve at least one other fourth device, wherein the at least one other fourth device is served by the second device.

2. The first device of claim 1, wherein the first device is caused to establish the communication interface by:
   receiving a request for establishing the communication interface from the second device; and
   transmitting a response indicating establishment of the communication interface to the second device.

3. The first device of claim 1, wherein the first device is caused to transmit the command by:
   transmitting a configuration update message comprising information concerning the cells.

4. The first device of claim 1, wherein the first device is further caused to:
   receive from the second device an indication indicating that a service status of the cells is In-Service.

5. The first device of claim 4, wherein the first device is caused to receive the indication by:
   receiving a configuration update acknowledge message comprising the indication.

6. A second device, comprising:
   at least one processor; and
   at least one memory including computer program code;
   the at least one memory and the computer program code configured to, with the at least one processor, cause the second device to:
   establish a communication interface between a first device and the second device;
   perform a handover from a third device to the first device;
   receive from the first device a command indicating the second device to activate cells configured by the first device; and
   activate the cells based on the command, wherein the command is to serve at least one other fourth device, wherein the at least one other fourth device is served by the second device.

7. The second device of claim 6, wherein the second device is caused to establish the communication interface by:
   transmitting a request for establishing the communication interface to the first device; and receiving from the first device a response indicating establishment of the communication interface.

8. The second device of claim 6, wherein the second device is caused to receive the command by:
receiving a configuration update message comprising information concerning the cells.

9. The second device of claim 6, wherein the second device is further caused to:
transmit to the first device an indication indicating that a service status of the cells is In-Service.

10. The second device of claim 9, wherein the second device is caused to transmit the indication by:
transmitting a configuration update acknowledge message comprising the indication.

11. A method, comprising:
establishing, by a first device, a communication interface between the first device and a second device;
receiving from the second device a handover complete message indicating that a handover of the second device from a third device to the first device is completed; and
transmitting to the second device a command indicating the second device to activate cells configured by the first device to serve at least one other fourth device, wherein the at least one other fourth device is served by the second device.

12. The method of claim 11, wherein the first device is caused to establish the communication interface by:
receiving a request for establishing the communication interface from the second device; and
transmitting a response indicating establishment of the communication interface to the second device.

13. The method of claim 11, wherein the command is transmitted by:
transmitting a configuration update message comprising information concerning the cells.

14. The method of claim 11, further comprising:
receive from the second device an indication indicating that a service status of the cells is In-Service.

15. The method of claim 14, wherein the indication is received by:
receiving a configuration update acknowledge message comprising the indication.

* * * * *